US012138955B2

(12) United States Patent
Vedvig

(10) Patent No.: US 12,138,955 B2
(45) Date of Patent: Nov. 12, 2024

(54) ADJUSTABLE CANVAS WRAP FRAME MOUNTING SYSTEM

(71) Applicant: Cody Vedvig, Prescott, AZ (US)

(72) Inventor: Cody Vedvig, Prescott, AZ (US)

( * ) Notice: Subject to any disclaimer, the term of this patent is extended or adjusted under 35 U.S.C. 154(b) by 12 days.

(21) Appl. No.: 18/100,961

(22) Filed: Jan. 24, 2023

(65) Prior Publication Data

US 2023/0158827 A1 May 25, 2023

Related U.S. Application Data

(63) Continuation of application No. 16/875,380, filed on May 15, 2020, now Pat. No. 11,597,232.

(60) Provisional application No. 62/848,986, filed on May 16, 2019.

(51) Int. Cl.

*G09F 1/06* (2006.01)
*A47G 1/06* (2006.01)
*B44D 3/18* (2006.01)
*G09F 15/00* (2006.01)

(52) U.S. Cl.

CPC ............... *B44D 3/185* (2013.01); *A47G 1/06* (2013.01); *G09F 15/0012* (2013.01); *A47G 2001/0661* (2013.01)

(58) Field of Classification Search

CPC ....... B44D 3/185; G09F 15/0012; A47G 1/06; A47G 2001/0661; A47G 2001/0694

See application file for complete search history.

(56) References Cited

U.S. PATENT DOCUMENTS

| | | | | |
|---|---|---|---|---|
| 1,446,367 A | 2/1923 | Zelan | | |
| 1,494,136 A | 5/1924 | Rybicky | | |
| 2,013,772 A * | 9/1935 | Ulrich | B44D 3/185 | 101/126 |
| 2,456,225 A * | 12/1948 | Thomas | B44D 3/185 | 160/402 |
| 2,760,299 A * | 8/1956 | Gable | B44D 3/185 | 38/102.2 |
| 4,027,413 A * | 6/1977 | Moede | B44D 3/185 | 40/792 |
| 4,422,251 A * | 12/1983 | Hedrick | D05C 1/02 | 38/102.2 |
| 4,635,700 A * | 1/1987 | Berger | B44D 3/185 | 160/374.1 |
| 5,046,545 A * | 9/1991 | Loomis | G09F 15/0025 | 160/368.1 |
| 5,314,159 A * | 5/1994 | Szarata | A47G 1/06 | 248/476 |
| D418,261 S | 12/1999 | Betts et al. | | |
| 9,962,019 B1 | 5/2018 | Padilla | | |
| 2017/0265660 A1* | 9/2017 | Cappelle | A47G 1/065 | |
| 2017/0361645 A1* | 12/2017 | D'Avino | B44D 3/185 | |

* cited by examiner

*Primary Examiner* — Gary C Hoge

(74) *Attorney, Agent, or Firm* — Berg Hill Greenleaf Ruscitti LLP

(57) ABSTRACT

The current invention may include an improved canvas wrap frame mount having an upper and a lower display support that may be secured along the top and bottom surfaces of a canvas wrap picture by a plurality of low profile adjustable couplers. In another embodiment, the invention may include an extendable canvas wrap frame mount having an upper and a lower display support that may be independently expandable along the length of a leading edge of a canvas wrap.

5 Claims, 6 Drawing Sheets

ADJUSTABLE CANVAS WRAP FRAME MOUNTING SYSTEM

CROSS-REFERENCES TO RELATED APPLICATION

This application is a continuation of U.S. application Ser. No. 16/875,380, filed May 15, 2020; which claims the benefit of and priority to U.S. Provisional Application No. 62/848,986 filed May 16, 2019, the entireties of these related applications being incorporated herein by reference.

TECHNICAL FIELD

The invention relates to the field of image frames, and in particular an improved system to adjustably mount and display a framed canvas image, such as a stretch canvas wrap.

BACKGROUND

Canvas art, such as gallery canvas wraps, are often presented in a frame. Typically, a section of canvas displaying the desired image or artwork is stretched and stapled to an internal wooden frame. The dimensions of the canvas can vary considerably, but the height of the frame (i.e. the distance between the wall and the attached canvas) has different standard dimensions. However, in the case of canvas wraps, the image or artwork extends to the edge of the frame making it difficult and impractical to display the canvas wrap in a secondary or external decorative frame.

For example, traditional frames require the canvas to be slotted into the frame where a portion of the image or artwork may be covered. In addition, the dimension of typical artwork frames are fixed and static and as such, cannot be adjusted to fit different sized images, such as canvas wraps. Therefore, there exists a need for a practical solution for displaying a canvas wrap image in a secondary decorative display, that may also be adjustable so as to be able to accommodate a variety of differently sized canvas wrap images.

SUMMARY OF THE INVENTION

One aspect of the current invention includes canvas wrap frame mount. In one preferred embodiment, this canvas wrap frame mount may provide a low profile frame that may be coupled along the ledges of a gallery canvas wrap forming an aesthetically distinctive display that does not block any part of the image or artwork to be displayed.

Another aspect of the current invention includes a canvas wrap frame mount having an upper and a lower display support that may be secured along the top and bottom surfaces of a canvas wrap picture.

Another aspect of the invention may include a canvas wrap frame mount having an upper and a lower display support that may be secured along the top and bottom surfaces of a canvas wrap picture by a plurality of adjustable couplers.

Another aspect of the invention may include a canvas wrap frame mount having an upper and a lower display support that may be secured along the top and bottom surfaces of a canvas wrap picture by a plurality of low profile adjustable couplers.

Another aspect of the invention may include an extendable canvas wrap frame mount having an upper and a lower display support that may be independently expandable along the length of a leading edge of a canvas wrap.

Another aspect of the invention may include an extendable canvas wrap frame mount having a static baseplate coupled with one or more display support through one or more rail slides secured to the rear surface of the baseplate of the invention.

Another aspect of the invention may include an extendable canvas wrap frame mount having a static baseplate coupled with one or more rail slides secured to the rear surface of the baseplate and further coupled with one or more support mount secured to one or more display supports positioned to slide independently across the front display surface of the baseplate of the invention.

Another aspect of the invention may include an extendable canvas wrap frame mount having a static baseplate coupled with one or more rail slides secured to the rear surface of the baseplate in one or more recessed positions and further coupled with one or more support mount secured to one or more display supports positioned to slide independently across the front display surface of the baseplate of the invention.

Another aspect of the invention may include an extendable canvas wrap frame mount having a static baseplate coupled with one or more rail slides secured to the rear surface of the baseplate by one or more rail guides secured within a recessed position and further coupled with one or more support mount secured to one or more display supports positioned to slide independently across the front display surface of the baseplate of the invention.

Additional aspects of the invention may further include one or more of the following preferred embodiments:

1. A canvas wrap frame mount comprising:
   - a canvas wrap or art display secured to an internal frame;
   - one or more display supports configured to be positioned along a leading edge of a canvas wrap or art display;
   - a plurality of adjustable couplers secured to the display surface of said one or more display supports; and
   - wherein said plurality of adjustable couplers are configured to secure said one or more display supports with said internal frame such that the display surface of said one or more display supports does not substantially interfere with the presentation of the image display.
2. The device of embodiment 1, wherein said plurality of adjustable couplers comprise a plurality of adjustable couplers having a frame catch.
3. The device of embodiment 2, wherein said plurality of adjustable couplers having a frame catch comprise a plurality of adjustable couplers having a frame catch having an adjustable compressor.
4. The device of embodiment 2, wherein said leading edge of said canvas wrap comprise the top or bottom edge of the canvas wrap.
5. The device of embodiment 2, wherein said plurality of adjustable couplers comprise a plurality of clamp couplers.
6. The device of embodiment 2, wherein said wherein said plurality of adjustable couplers are substantially flush with the support surface of said one or more display supports such that the canvas wrap may be secured to a flat surface.
7. The device of embodiment 2, and further comprising a display stand secured to the support surface of said one or more display supports.
8. An expandable frame mount comprising:
   - a canvas wrap or art display secured to an internal frame;
   - at least one baseplate having a display surface and a rail support surface configured to be positioned along a leading edge of said canvas wrap or art display;

at least one recessed rail guide positioned on said rail support surface of said baseplate; and a plurality of interlocking rail slides positioned within said recessed rail guide each coupled with a slide display support and configured to expand or contract causing said slide display supports to independently transit along the length of the base plate in response to movement of said interlocking rail slides.

9. The device of embodiment 8, wherein said plurality of interlocking rail slides are each coupled with a slide display support through a support mount.

10. The device of embodiment 9, wherein said support mount comprises a support mount having a mount recess configured to secure an interlocking rail slide.

11. The device of embodiment 10, wherein said support mount having a mount recess configured to secure an interlocking rail slide comprises a support mount having a mount recess configured to secure an interlocking rail slide by a mount coupler.

12. The device of embodiment 8, and further comprising a rail guide configured to slidably couple at least one of said interlocking rail slides.

13. The device of embodiment 12, and further comprising a rail coupler configured to secure said rail guide on positioned on said rail support surface of said baseplate.

14. The device of embodiment 8, and further comprising a ridge position on said rail support surface of said baseplate.

15. The device of embodiment 8, and further comprising a plurality of adjustable couplers secured to said ridge position on said rail support surface of said baseplate.

16. The device of embodiment 15, wherein said adjustable couplers are configured to secure one or more slide display supports with said internal frame such that the display surface of said one or more slide display supports does not substantially interfere with the presentation of the image display.

17. The device of embodiment 16, wherein said plurality of adjustable couplers comprise a plurality of adjustable couplers having a frame catch.

18. The device of embodiment 17, wherein said plurality of adjustable couplers having a frame catch comprise a plurality of adjustable couplers having a frame catch having an adjustable compressor.

19. The device of embodiment 8, herein said leading edge of said canvas wrap comprise the top or bottom edge of the canvas wrap.

20. An expandable canvas wrap frame mount comprising:

a canvas wrap secured to an internal frame;

at least one baseplate having a display surface and a rail support surface configured to be positioned along a leading edge of said canvas wrap;

at least one recessed rail guide positioned on said rail support surface of said baseplate; and a plurality of interlocking rail slides positioned within said recessed rail guide each coupled with mount support having a mount recess wherein said each mount support is coupled with at least one a slide display support and configured to expand or contract causing said slide display supports to independently transit along the length of the base plate in response to movement of said interlocking rail slides.

a plurality of rail guides positioned within said recessed rail guide and configured to slidably couple at least one of said interlocking rail slides;

a plurality of adjustable couplers secured to said one or more slide display supports; and wherein said plurality of adjustable couplers are configured to secure said one or more slide display supports with said internal frame such that the display surface of said one or more slide display supports does not substantially interfere with the presentation of the image display.

Further objects of the inventive technology will become apparent from the description and drawings below.

BRIEF DESCRIPTION OF DRAWINGS

The novel aspects, features, and advantages of the present disclosure will be better understood from the following detailed descriptions taken in conjunction with the accompanying figures, all of which are given by way of illustration only, and are not limiting the presently disclosed embodiments, in which.

DETAILED DESCRIPTION OF INVENTION

Figure 1:
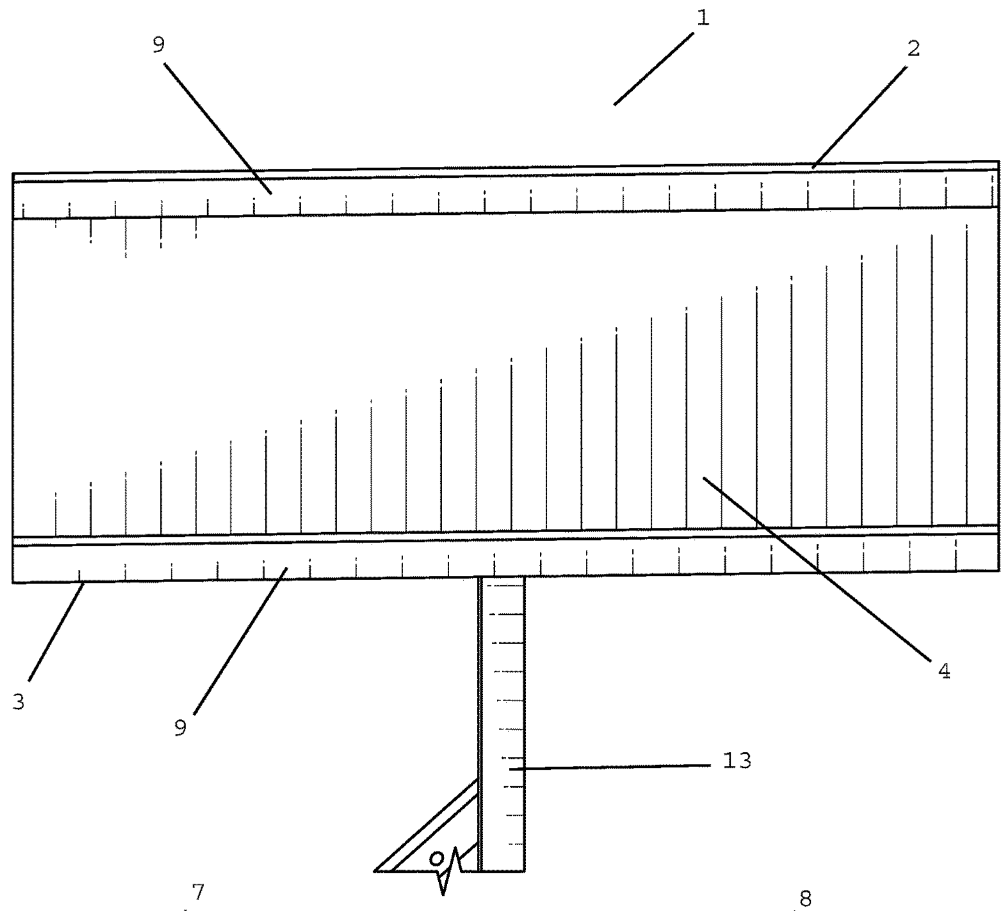
FIG. 1: is a front image of a canvas wrap frame mount securing a canvas wrap image display in one embodiment thereof.

The present invention includes a variety of aspects, which may be combined in different ways. The following descriptions are provided to list elements and describe some of the embodiments of the present invention. These elements are listed with initial embodiments; however, it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

The invention may include a novel design for a canvas wrap frame mount (1). In one preferred embodiment the canvas wrap frame mount (1) of the invention may include one, or a plurality of display supports (2,3). As generally shown in FIGS. 3-6, a display may be configured to be positioned along the outer edge of an internally framed canvas wrap, or another framed image or artwork. In the preferred embodiment shown in the figures, a canvas wrap (10) may be positioned between an upper display support (2) and a lower display support (3). It should be noted that, while the images demonstrate two distinct display supports (2,3) which are made of linear shaped beams, this is not limiting on the number and shape of the display supports (2,3), nor the variety of material that may be encompassed within this disclosure. As noted below, in certain embodiments, design elements such as shape and color may be added to the display supports (2,3,16,17) and baseplate (15) of the invention.

Again, referring to FIG. 3-6, a display support (2,3) may include a display surface (9) that may be facing in the same direction as the image display (4) surface of the canvas wrap (10). A display support (2,3) may further include a support surface (8) that is positioned to be in the same direction as the back of the canvas wrap (10).

In another embodiment, one or more adjustable couplers (7) may be positioned on the support surface (8) of a display support (2,3). As specifically highlighted in FIGS. 3, a plurality of adjustable couplers (7) may be secured to the support surface (8) of an upper and lower display support (2,3). In this preferred embodiment, an adjustable coupler (7) may be secured to the support surface (8) of a display support (2,3) through a fastener, such as a screw or nail or other similar fastening mechanisms. The adjustable coupler (7) may further be configured to extend outward from the display support (2,3) and may further include a frame catch (11) that may be positioned near the internal frame (5).

Figure 2:
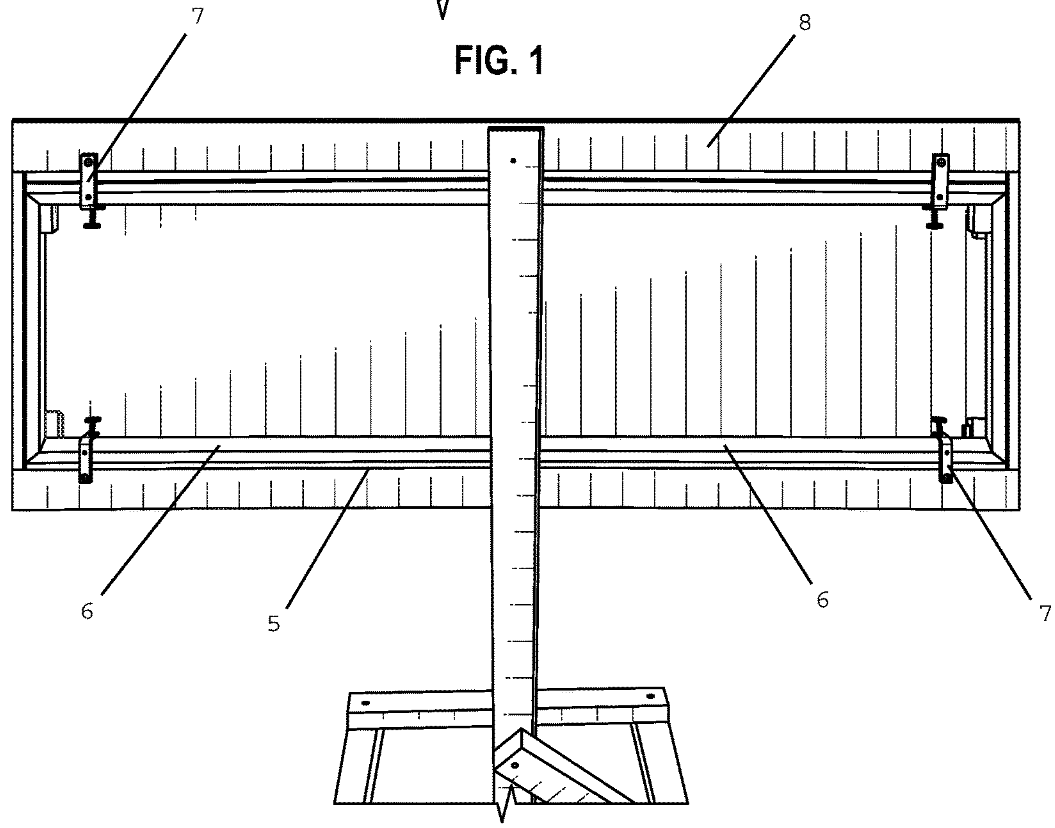
FIG. 2: is a back image of a canvas wrap frame mount having an upper and lower support securing a canvas wrap image display in one embodiment thereof.
Figure 3:
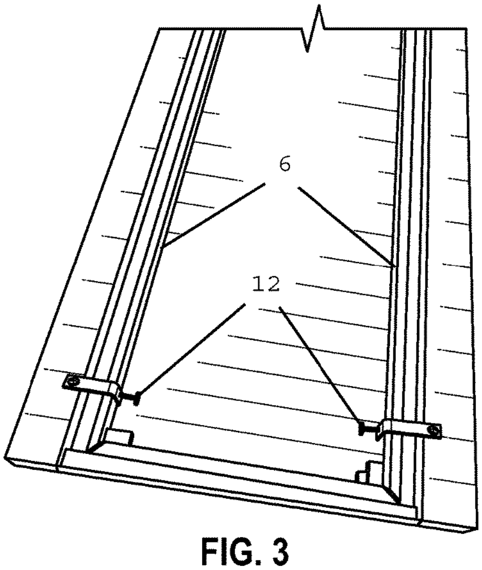
FIG. 3: is an image of a canvas wrap frame mount having upper and lower support securing a canvas wrap image display with a plurality of adjustable couplers in one embodiment thereof.
Figure 4:
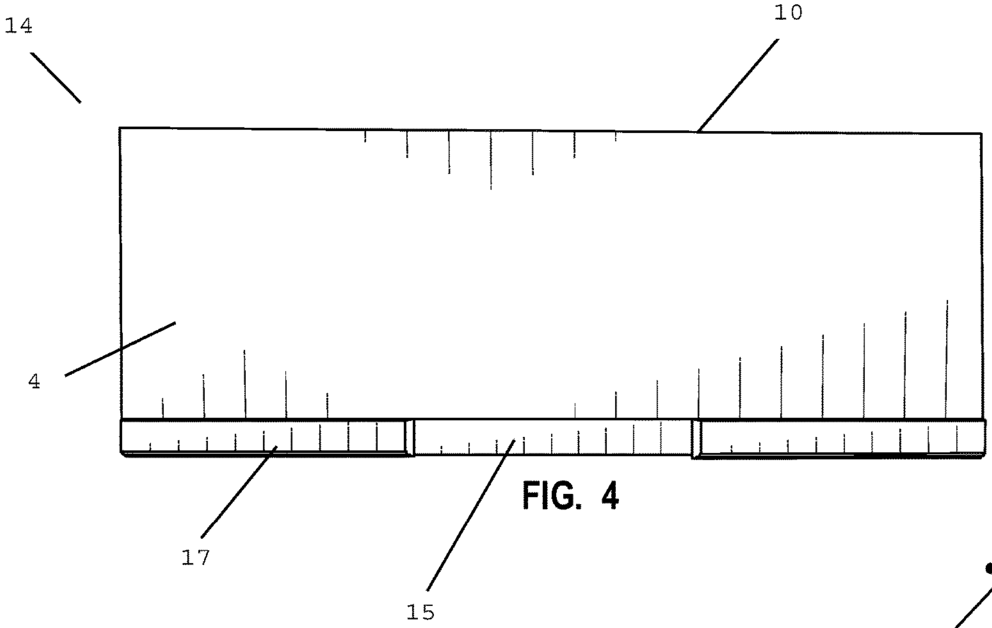
FIG. 4: is an image of a canvas wrap frame mount having a lower support securing a canvas wrap image display.
Figure 5:
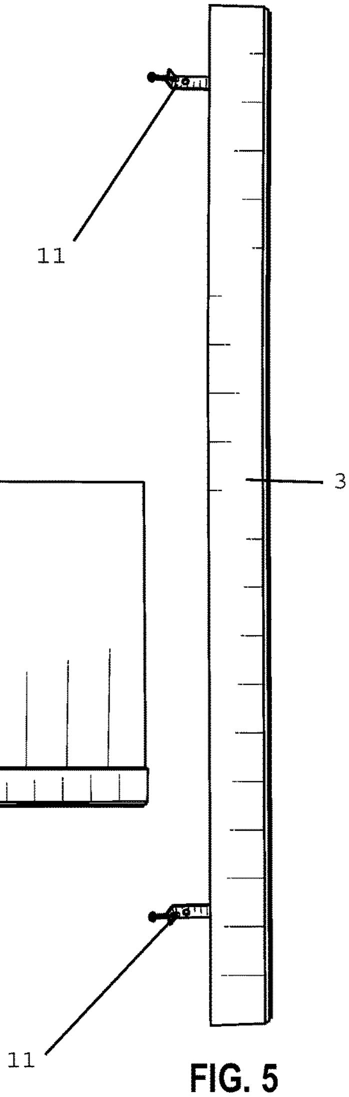
FIG. 5: is a back view of an isolated support of a canvas wrap frame mount in one embodiment thereof.
Figure 6:
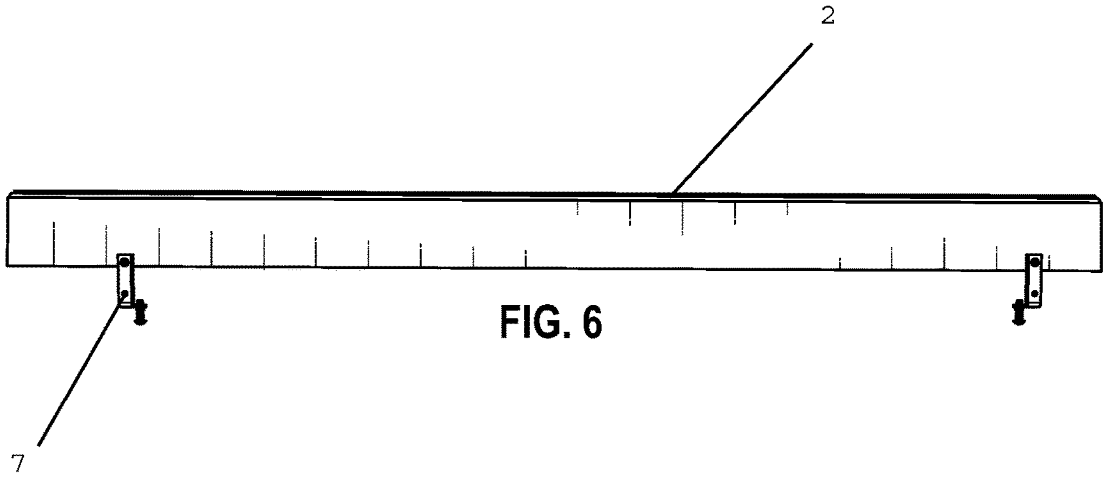
FIG. 6: is a back view of an isolated support of a canvas wrap frame mount in one embodiment thereof.

Generally referring to FIGS. 1-2, a canvas wrap frame mount (1) may be formed by placing an upper and lower display support (2,3) along the top and bottom leading edges of a canvas wrap (10). The internal frame (5) supporting the canvas wrap (10) may then be secured to the upper and lower display support (2,3) with the image display (4) facing the same direction as the display surface of the upper and lower display support (2,3) forming a desired presentation. As highlighted in FIGS. 2-4, the internal frame (5) may be positioned such that its frame edge (6) is placed in close proximity to an adjustable coupler (7), and in particular a frame catch (11). In this preferred embodiment, an adjustable compressor (12) may be brought into contact with the frame edge (6) and secure the internal frame (5) to the upper and lower display support (2,3) forming a canvas wrap frame mount (1). While the preferred embodiment shown in the figures uses a screw compression element, any appropriate coupler may be employed by the invention. For example, a spring-loaded coupler, a snap coupler, a slide coupler, and the like may be used to secure the internal frame (5) to the upper and lower display support (2,3) forming a canvas wrap frame mount (1).

Naturally, a canvas wrap frame mount (1) may include one or more side display supports (not shown) that may be similarly positioned. In still further embodiment, the upper and lower display supports (2,3) may extend along the horizontal as well as vertical edges of a canvas wrap (10), partially or fully encasing the image display (4). In some embodiment, the upper and lower display supports (2,3) may form a unitary component that may be secured to a canvas wrap (10) as generally described herein, such that the unitary display supports the fully encased image display (4).

In certain embodiments, this adjustable coupler (7) may include a limited profile such that it may be approximately flush with the support surface (8) of a display support (2,3). In this configuration, the canvas wrap frame mount (1) may be hung on a wall or other similar surface, such that the mount may be approximately flush with the surface. In additional embodiments, a canvas wrap frame mount (1) may be secured by a display stand (13) or other similar support. In one preferred embodiment, a display stand (13) may be coupled with one or more elements of the canvas wrap frame mount (1), for example through a fastener, such as a screw or nail, or a coupler such as a clamp or snap lock.

As noted above, art frames, and in particular canvas wrap frames are generally static and cannot be adjusted to accommodate image displays of varying dimensions. This is especially prevalent as the popularity of oversized canvas wraps artwork has gained popularity over the years. To address this limitation, another preferred embodiment of the invention may include an expandable canvas wrap frame mount configured to be expanded vertically and optionally horizontally to accommodate canvas wraps of varying sizes and dimensions.

Generally referring to FIGS. 7-15, invention may include a novel design for an expandable canvas wrap frame mount (14). In one preferred embodiment the expandable canvas wrap frame mount (14) of the invention may include one, or a plurality of slide display supports (16, 17).

Figure 7:
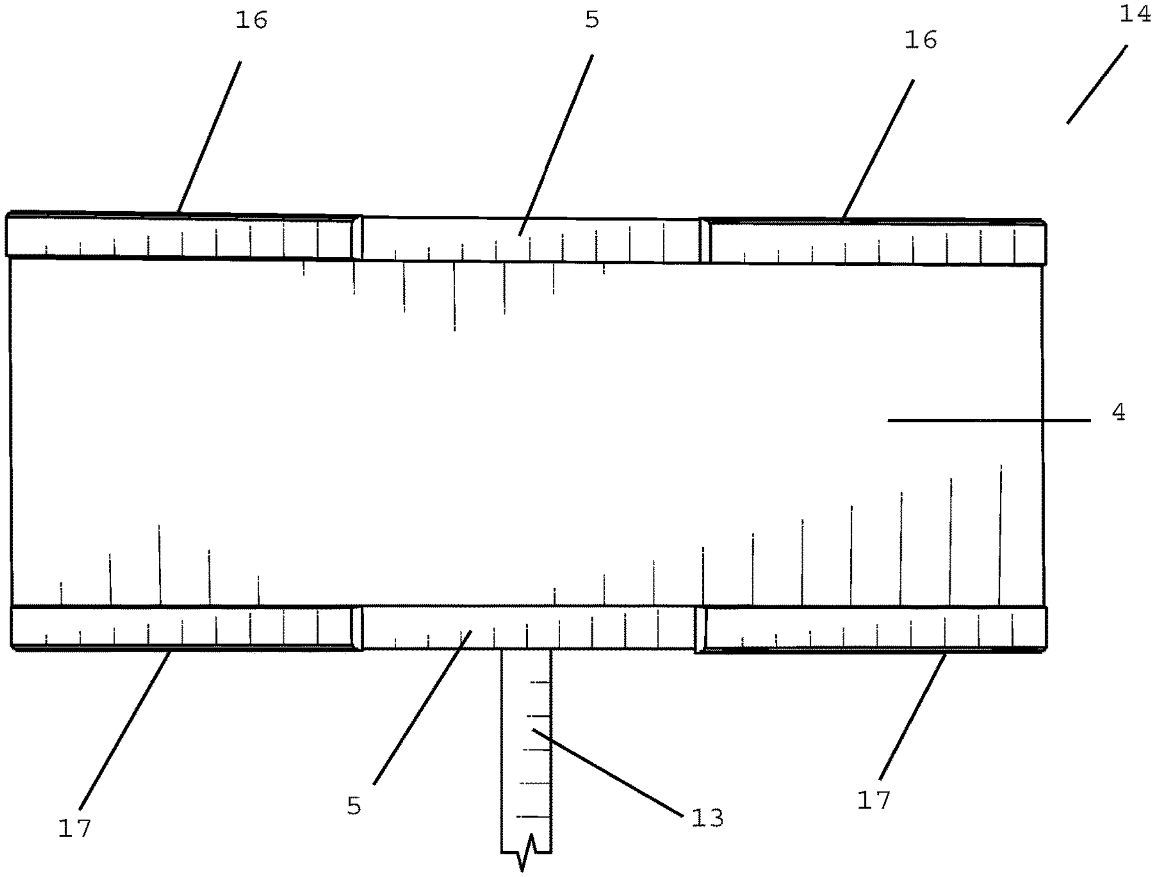
FIG. 7: is a front image of an expandable canvas wrap frame mount having a plurality of upper and lower slide display supports coupled with a baseplate securing a canvas wrap image display in one embodiment thereof.

As generally shown in FIG. 7, one or more slide display supports (16, 17) may be configured to be positioned along the outer edge of an internally framed canvas wrap (10), or another framed image or artwork. In the preferred embodiment shown in the figures, a canvas wrap (10) may be positioned between an upper slide display support (16) and a lower slide display support (17). In an alternative embodiment shown in FIG. 4, a single lower slide display support (16) may be configured to be positioned along the outer edge, and in this case the bottom leading edge, of an internally framed canvas wrap (10), or another framed image or artwork. As noted elsewhere, while the figures demonstrate an upper and lower slide display support (16, 17) positioned along the top and bottom of a canvas wrap (10), side slide display supports operating in a similar to the lower slide display supports (16, 17) may also be encompassed within the scope of the invention. Also, it is notable that in certain embodiments, upper and lower display supports of the invention may be configured to be interchangeable.

Figure 8:
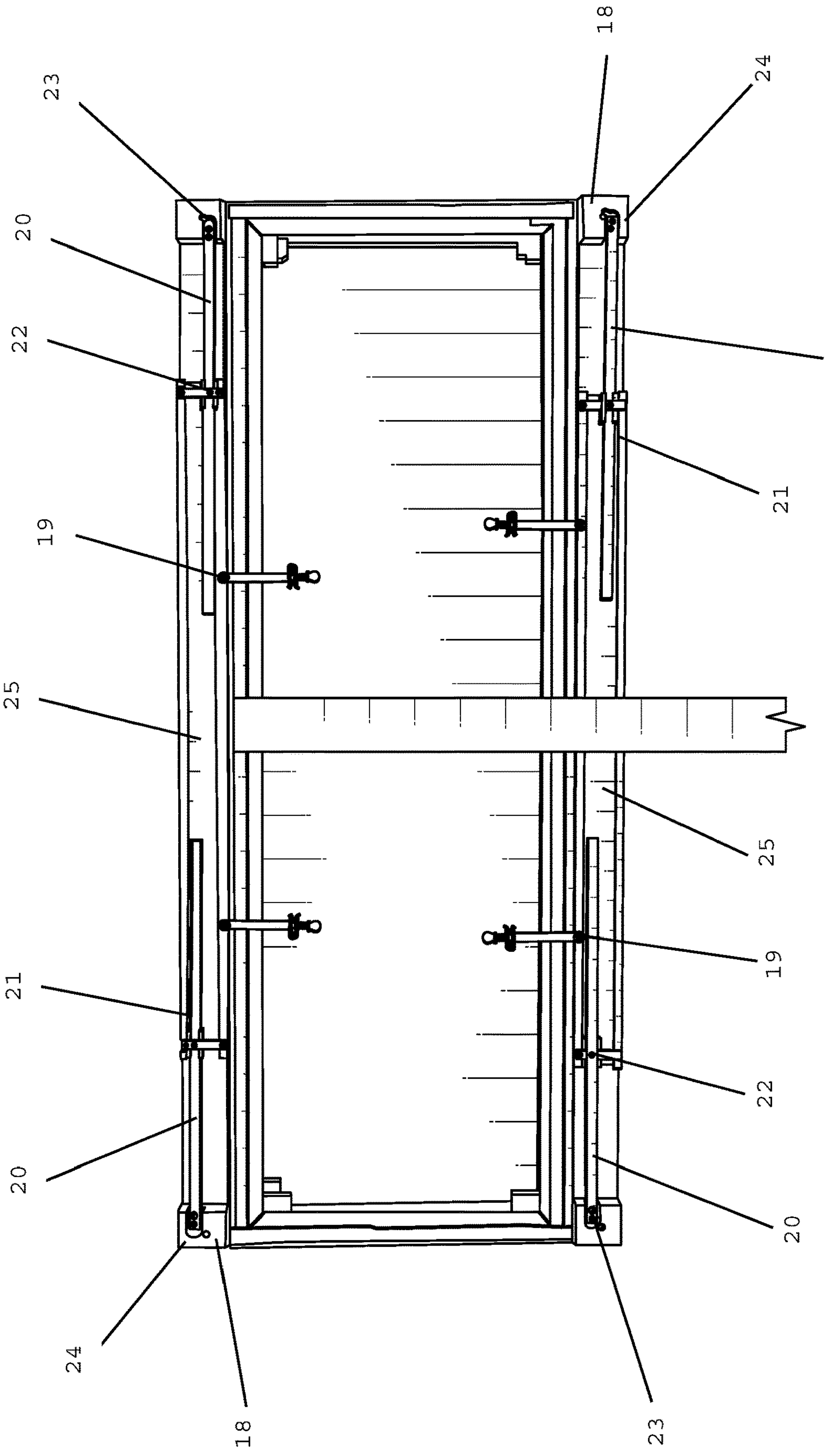
FIG. 8: is a front image of an expandable canvas wrap frame mount having a plurality of independently movable upper and lower slide display supports coupled with a baseplate through a plurality of mount support each coupled with an interlocking rail slide positioned within a recessed position on the rear surface of the baseplate in one embodiment thereof.
Figure 9:
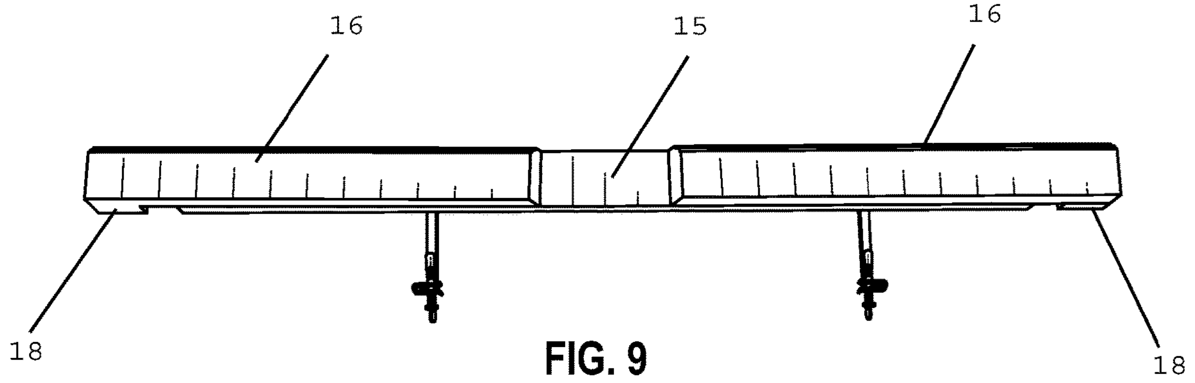
FIG. 9: is a front perspective view of an isolated upper independently movable upper slide display support having a plurality of adjustable couplers configured to secure a canvas wrap frame in one embodiment thereof.
Figure 10:
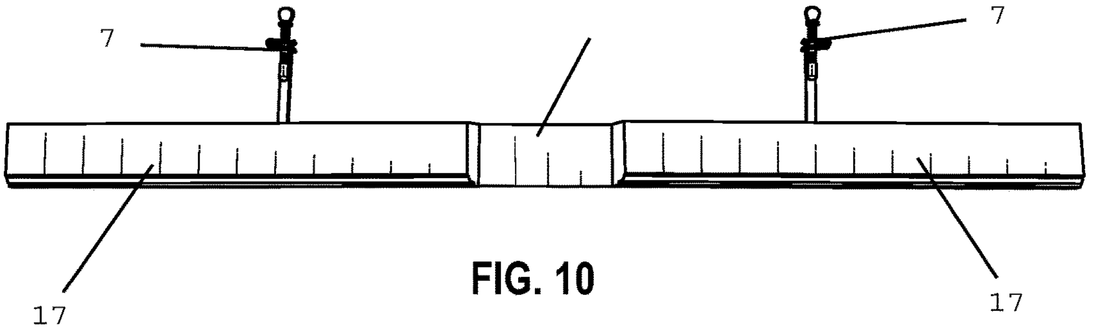
FIG. 10: is a front perspective view of an isolated upper independently movable upper slide display support having a plurality of adjustable couplers configured to secure a canvas wrap frame in one embodiment thereof.
Figure 11:
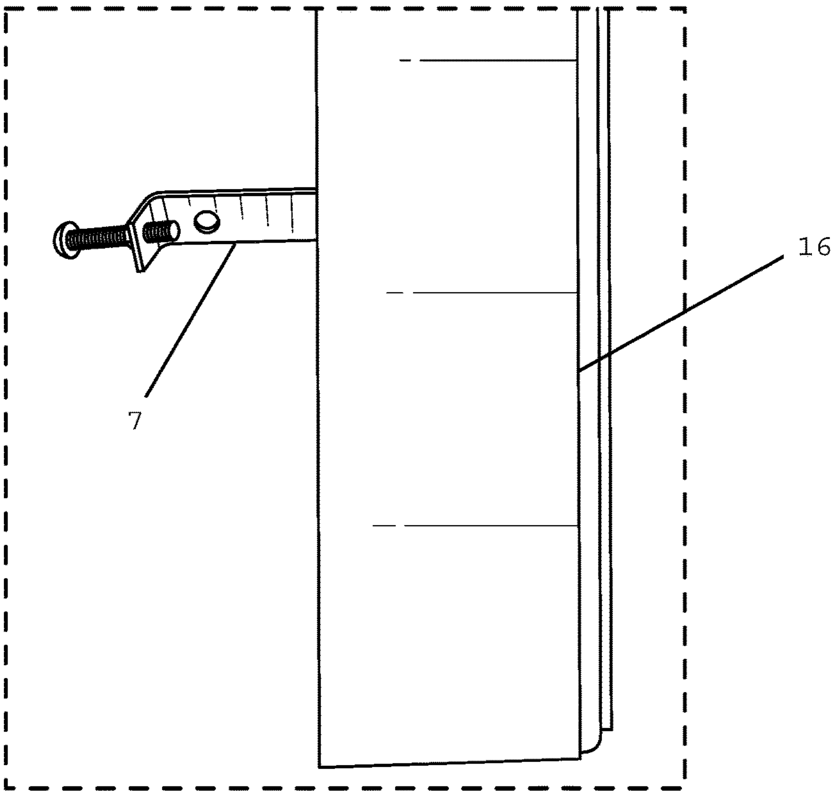
FIG. 11: is an expanded view of an adjustable coupler secured to a display support in one embodiment thereof.
Figure 12:
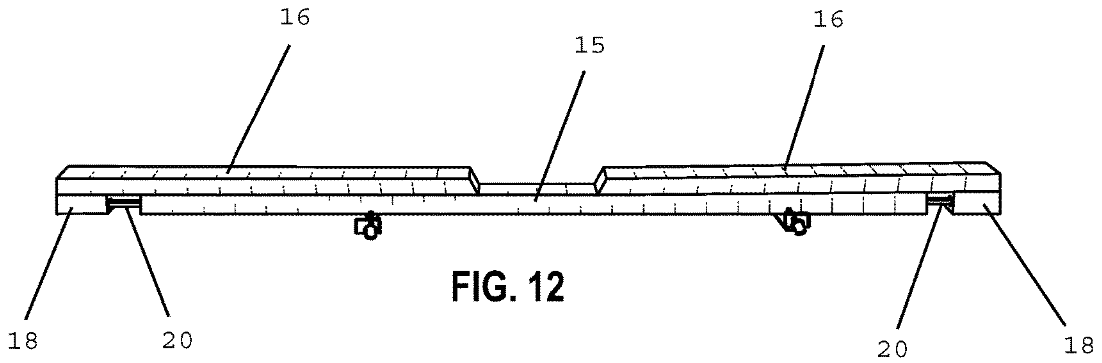
FIG. 12 is a top perspective view of an isolated upper independently movable upper slide display support having a plurality of adjustable couplers configured to secure a canvas wrap frame in one embodiment thereof.
Figure 13:
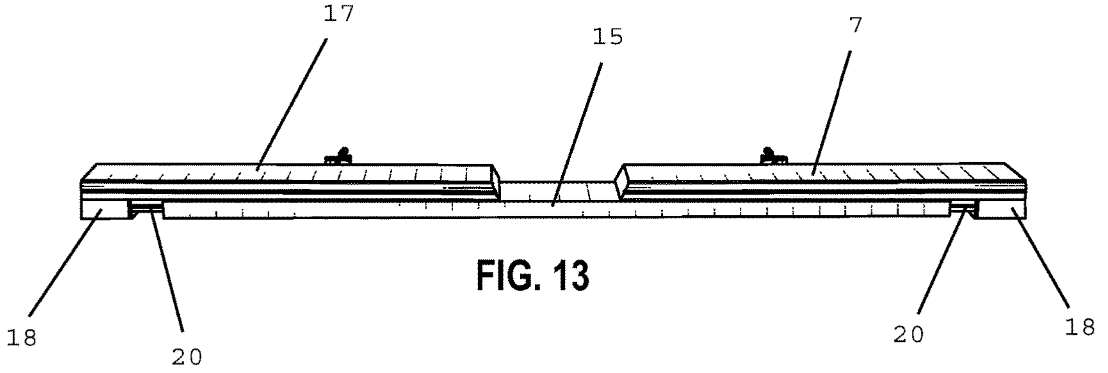
FIG. 13 is a top perspective view of an isolated upper independently movable upper slide display support having a plurality of adjustable couplers configured to secure a canvas wrap frame in one embodiment thereof.

Referring specifically to FIGS. 7-8, the exemplary slide display supports (16, 17) may include a baseplate (15) having a front display surface (9) that may be facing in the same direction as the image display (4) surface of the canvas wrap (10). The slide display support(s) (16,17) of this embodiment may further include a rail support surface (25) that is positioned to be in the same direction as the back of the canvas wrap (10).

The baseplate (15) of the invention may be slidably coupled with a plurality of independently expandable slide display support(s) (16,17) such that the display supports positioned along one or more outer surfaces of a canvas wrap (10) may be independently expanded or contracted along the leading edge of the canvas wrap (10). In this embodiment shown in FIGS. 8, 12-15, the baseplate (15) of the invention may include a plurality of recessed rail guides (26) configured to each slidably secure at least one interlocking rail slide (20). In this configuration, an interlocking rail slide (20), such as a metal rod or other similar support components may be positioned within the recessed formed by the recessed rail guides (26) such that they may be positioned substantial flush with, or below the rail support surface (25) of the baseplate (15) of the invention.

Figure 14:
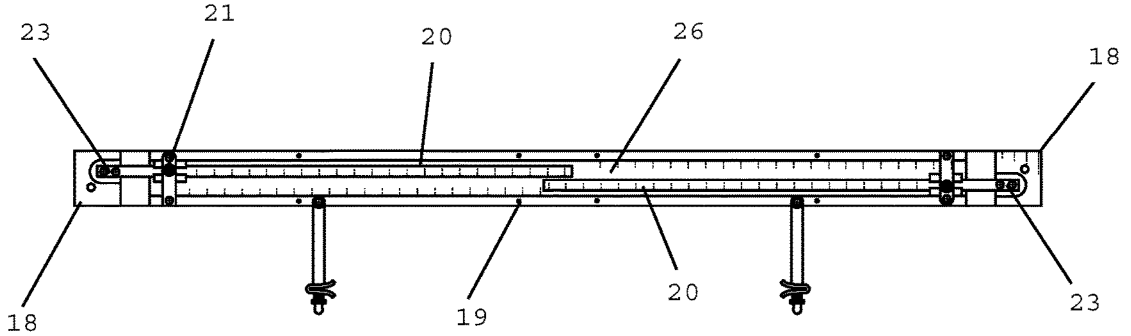
FIG. 14 is a back view of an isolated upper independently movable upper slide display support having a plurality of interlocking rail slides each positioned within a recessed position on the baseplate and further coupled with a support mount.
Figure 15:
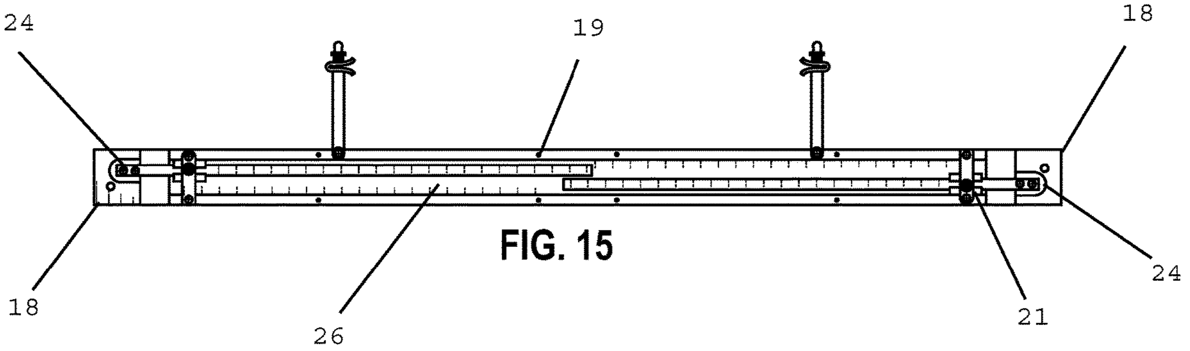
FIG. 15 is a back view of an isolated upper independently movable lower slide display support having a plurality of interlocking rail slides each positioned within a recessed position on the baseplate and further coupled with a support mount.

Referring now to FIGS. 8 and 14-15, in this embodiment each interlocking rail slide (20) may be positioned within the recessed rail guides (26) of the baseplate (15) with the terminal end of the rail being further secured to a support mount (18). As shown in FIG. 8, the terminal end of the interlocking rail slide (20) may be positioned within a mount recess (24) on the support mount (18) such that it is substantial flush with, or below the rear surface of the support mount (18), and further secured to the support mount (18) by a mount coupler (23). The mount coupler (23) of the invention may include for example a fastener, such as a screw or nail, or a coupler such as a clamp or snap lock that may further be positioned substantial flush with, or below the rear surface of the support mount (18).

Referring again to FIGS. 1 and 12-15, in this embodiment a support mount (18) secured to a rail may be coupled with and interlocking rail slide (20) may be secured to an independently expandable slide display support(s) (16,17) such that expansion and/or retraction of the independently expandable slide display support(s) (16,17) may cause the display supports (16,17) to independently expand or contract along the length of the baseplate (15) of the invention. Notably, in this embodiment, the baseplate (15) remains static compared to the movement of the independently expandable slide display support(s) (16,17) such that the display surface of the baseplate (15) is not physically connected to the independently expandable slide display support(s) (16,17).

As shown in FIG. 8, the independently expandable slide display support(s) (16,17) may be extended to a customizable length to fit the size of a canvas wrap (10) with the interlocking rail slides (20) providing a rigid frame network for the display support(s) (16,17) while configured in the extended configuration. Notably, while in the contracted configuration, the interlocking rail slides (20) may be positioned within their respective recessed rail guides (26) in an interlocking configuration. As a result, in certain embodiments, the mount recesses (24) on their respective support mounts (18) may be configured in an off-set configuration to accommodate the position of the interlocking rail slides (20).

Again, referring to FIG. 14-15, in one preferred embodiment one or more of the interlocking rail slides (20) of the invention may be further secured by a rail guide (21). In this embodiment, a rail guide (21) may be positioned on the rail support surface (25) of the baseplate (15) and may support and maintain the position of the interlocking rail slides (20) during their transit. The use of one or more rail guides (21) may be especially applicable when the recessed rail guide (26) of the invention comprise a single recessed position on the rail support surface (25) of the baseplate (15). In this preferred embodiment, a rail guide (21) may be positioned at the terminal ends of the rail support surface (25) of the baseplate (15) and configured to slidably secure one or more interlocking rail slides (20) into a desired substantially vertical, horizontal or angled orientation as may be desired.

Additional rail guides (21) may be positioned on the rail support surface (25) of the baseplate (15) and configured to support and orientate the interlocking rail slides (20) of the invention. In still further embodiment, one or more rail couplers (22) may be configured to secured one or more rail guides (21) positioned on the rail support surface (25) of the baseplate (15). This optional embodiment may include a cross-bean securing the one or more rail guides (21) in position, while providing a top surface of rail guides (21) further securing the interlocking rail slides (20) into a desired substantially vertical, horizontal, or angled orientation as may be desired.

As shown in FIG. 8, in this embodiment one or more adjustable couples may be secured to the rail support surface (25) of the baseplate (15), and more specifically along the proximal and/or distal ridge (19) formed by the recessed rail guides (26).

Naturally, all embodiments discussed herein are merely illustrative and should not be construed to limit the scope of the inventive technology consistent with the broader inventive principles disclosed. As may be easily understood from the foregoing, the basic concepts of the present inventive technology may be embodied in a variety of ways. It generally involves systems, methods, and techniques as well as devices to accomplish a novel canvas wrap frame mount. In this application, the techniques, including novel and unique uses of manufacturing methods and materials, are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the inventive technology and may not explicitly show how each feature or element can actually be representative of a broader function or of a great variety of alternative or equivalent elements. Again, these are implicitly included in this disclosure. Where the inventive technology is described in device-oriented terminology, each element of the device implicitly performs a function. Apparatus claims may not only be included for the device described, but also methods or process claims may be included to address the functions the inventive technology and each element performs. Neither the description nor the terminology is intended to limit the scope of the claims that will be included in any subsequent patent application.

It should also be understood that a variety of changes may be made without departing from the essence of the inventive technology. Such changes are also implicitly included in the description. They still fall within the scope of this inventive technology. A broad disclosure encompassing both the explicit embodiment(s) shown, the great variety of implicit alternative embodiments, and the broad apparatus, methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the inventive technology both independently and as an overall system.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of "coupler method and/or technique, and or device." Such changes and alternative terms are to be understood to be explicitly included in the description.

Thus, the applicant(s) should be understood to have support to claim and make a statement of invention to at least: i) each of the methods, apparatus, improvements and/or devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term “comprise” or variations such as “comprises” or “comprising”, are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, “or any other claim” is used to provide support for any claim to be dependent on any other claim, such as another dependent claim, another independent claim, a previously listed claim, a subsequently listed claim, and the like. As one clarifying example, if a claim were dependent “on claim 20 or any other claim” or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the inventive technology, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A canvas wrap frame mount comprising:

a canvas wrap or art display secured to an internal frame;

one or more display supports positioned along a leading edge of the canvas wrap or art display such that the bottom surface of the one or more display supports are approximately flush with the front surface of an image display surface of the canvas wrap or art display;

one or more adjustable couplers secured to the support surface of said one or more display supports by one or more fasteners and further secured to the internal frame by a frame catch having an adjustable compressor; and wherein the adjustable couplers are configured to secure said one or more display supports with said internal frame such that the display surface of said one or more display supports does not substantially block the presentation of the image display surface.

2. The device of claim 1, wherein said leading edge of said canvas wrap comprises the top or bottom edge of the canvas wrap or art display.

3. The device of claim 1, wherein said one or more adjustable couplers comprise a plurality of clamp couplers.

4. The device of claim 1, wherein said one or more adjustable couplers are substantially flush with the support surface of said one or more display supports such that the canvas wrap or art display can be secured to a flat surface.

5. The device of claim 1, and further comprising a display stand secured to the support surface of said one or more display supports.

* * * * *